(12) United States Patent
Petersen et al.

(10) Patent No.: US 11,513,594 B2
(45) Date of Patent: Nov. 29, 2022

(54) METHOD FOR OPERATING A PAIR OF SMART GLASSES

(71) Applicants: Robert Bosch GmbH, Stuttgart (DE); TRUMPF Photonic Components GmbH, Ulm (DE)

(72) Inventors: Andreas Petersen, Stuttgart (DE); Thomas Alexander Schlebusch, Stuttgart (DE); Johannes Meyer, Stuttgart (DE); Hans Spruit, Ulm (DE); Jochen Hellmig, Ulm (DE)

(73) Assignees: TRUMPF PHOTONIC COMPONENTS GMBH, Ulm (DE); ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/336,849

(22) Filed: Jun. 2, 2021

(65) Prior Publication Data

US 2021/0373659 A1    Dec. 2, 2021

(30) Foreign Application Priority Data

Jun. 2, 2020 (DE) .......................... 102020206822.4

(51) Int. Cl.
*G06F 3/01* (2006.01)
*G02C 11/00* (2006.01)

(52) U.S. Cl.
CPC ............. *G06F 3/013* (2013.01); *G06F 3/017* (2013.01); *G02C 11/10* (2013.01)

(58) Field of Classification Search
CPC ...................................................... G06F 3/013
See application file for complete search history.

(56) References Cited

U.S. PATENT DOCUMENTS

| 2016/0274365 A1* | 9/2016 | Bailey | ................. G02B 27/017 |
| 2017/0131765 A1* | 5/2017 | Perek | ........................ G02F 1/13 |

(Continued)

FOREIGN PATENT DOCUMENTS

| DE | 102014206626 A1 | 10/2015 |
| DE | 102014210892 A1 | 12/2015 |
| DE | 102018214637 A1 | 3/2020 |

OTHER PUBLICATIONS

Search Report from corresponding DE Application No. 102020206822.4, dated Feb. 11, 2021, 8 pages.

(Continued)

*Primary Examiner* — Mark Edwards
*Assistant Examiner* — Chayce R Bibbee
(74) *Attorney, Agent, or Firm* — Tucker Ellis LLP

(57) ABSTRACT

A method for operating smart glasses includes an input unit and/or output unit and a gaze detection arrangement, wherein the gaze detection arrangement detects any eye movement of an eye including the steps of irradiating at least one wavelength-modulated laser beam to the eye, detecting an optical path length of the emitted laser beam based on laser feedback interferometry of the emitted laser radiation with backscattered radiation from the eye, detecting a Doppler shift of the emitted and backscattered radiation based on the laser feedback interferometry, and detecting an eye velocity based on the Doppler shift, and wherein the input unit and/or output unit is operated based on the optical path length and/or the eye velocity.

15 Claims, 3 Drawing Sheets

(56) References Cited

U.S. PATENT DOCUMENTS

| | | |
|---|---|---|
| 2017/0261610 A1 | 9/2017 | Scally et al. |
| 2019/0043392 A1 | 2/2019 | Abele |
| 2019/0163266 A1 | 5/2019 | Johnson et al. |
| 2020/0026350 A1* | 1/2020 | Eash ...................... H04N 7/183 |
| 2020/0285058 A1* | 9/2020 | Sangu ................ G02B 27/0172 |
| 2021/0271320 A1 | 9/2021 | Fiess et al. |
| 2021/0373659 A1 | 12/2021 | Petersen et al. |

OTHER PUBLICATIONS

Giuliani, Guido, et al., "Laser diode self-mixing technique for sensing applications", Journal of Optics A: Pure and Applied Optics, (2002), pp. S283-S294.

Pruijmboom, Armand, et al., "VCSEL-based miniature laser-Doppler interferometer", International Society for Optics and Photonics, (2008) vol. 6908, 69080I, 7 pages.

Search Report from corresponding DE Application No. 10 2020 206 821.6 dated Feb. 11, 2021, 7 pages.

\* cited by examiner

METHOD FOR OPERATING A PAIR OF SMART GLASSES

RELATED APPLICATION DATA

This application claims priority to and benefit of German Application No. DE 10 2020 206 822.4 filed Jun. 2, 2020, the entirety of which is incorporated by reference.

PRIOR ART

The present invention relates to a method for operating smart glasses as well as smart glasses.

The use of eye-tracking or eye detection (also known as oculography) to determine eye movements and to estimate a gaze direction is well known. The use of smart glasses is also known for the projection of images, for example onto a user retina. For example, gaze detection is used to adjust a control device of a projection unit of the pair of smart glasses, for example in displaying context-sensitive information. U.S. Pat. No. 7,637,615 B2 discloses such smart glasses using retina projection and eye tracking based on prism mirrors. Known systems for eye tracking are often based on detecting information on the eye position using camera-based systems or electrical or electromagnetic sensors in the region of the eye. In addition, scanned laser systems are known, which, for example, use micromirrors to scan a laser spot across the eye. All of these systems usually come with high complexity and energy consumption, frequently having limited temporal resolution.

DISCLOSURE OF THE INVENTION

In contrast, the method according to the invention having the features of claim 1 is characterized by a particularly energy-saving and cost-effective method of operating a pair of smart glasses having high user convenience. This is achieved by a method for operating a pair of smart glasses which comprises an input unit and/or output unit and a gaze detection arrangement. The gaze detection arrangement is used to determine any eye movement using the steps of:

irradiating an eye using at least one wavelength-modulated laser beam, detecting an optical path length of the emitted laser beam based on laser feedback interferometry of the emitted laser beam and radiation backscattered from the eye, detecting a Doppler shift, in particular between frequencies, of the emitted and the backscattered radiation based on laser feedback interferometry, and detecting an eye velocity based on the Doppler shift, wherein the input unit and/or output unit is operated based on the optical path length and/or the eye velocity.

Eye movement is considered as any movement of the eye, in particular relative to a head of the user of the smart glasses. In particular such an eye movement corresponds to a change of viewing direction of the eye. Further, the eye movement corresponds preferably to a rotation of the eye, in particular the eyeball, within the eye socket.

In other words, in eye movement determination, a wavelength-modulated laser beam, which is emitted in particular from a wavelength-modulated laser source, is irradiated onto an eye of a user. The laser beam is at least partially backscattered at an ocular surface. The backscattered radiation is that portion of the radiation scattered at the ocular surface which is parallel to the emitted laser beam, thus being able to interfere therewith. This backscattering portion interferes with the incident laser radiation, i.e. with the laser radiation propagating toward the eye. The backscattered portion of the irradiated laser beam may also be referred to as backscattered radiation. By means of the so-called laser feedback interferometry, overlap of the emitted laser beam with the backscattered radiation occurs, such that interference radiation resulting therefrom exists. This resulting interference radiation can be detected and analyzed for example by means of a detector.

The laser feedback interferometry is considered as the detection and analysis of the overlap of the irradiated laser beam and its backscattered portion, i.e. a detection and analysis of a resulting interference-radiation. Based on laser feedback interferometry, an optical path length of the emitted laser beam is determined. The optical path length is considered to be the product of a geometric distance covered by the emitted laser beam from the laser source to the surface of the eye and a refractive index of the material present there. This means that if the laser beam is emitted in air (refractive index of approx. 1) from a laser source directly towards the eye, the optical path length is a very good approximation of the distance between the laser source and the eye. For example, if the wavelength of the emitted laser radiation is known, the optical path length can be estimated based on constructive or destructive interference.

Preferably, triangle-modulated laser light is emitted as a wavelength-modulated laser beam within the wavelength. By analyzing the radiation which is interferingly emitted and backscattered, especially by calculating an average of the resulting interference frequencies with respect to the two edges of the triangle-modulated signal, the optical path length may be determined.

Furthermore, if there is a movement of the eye in relation to the interspersed laser radiation, a Doppler shift occurs, especially between the frequencies of the emitted and the backscattered radiation due to the Doppler effect. By means of laser feedback interferometry, this Doppler shift can be detected. The Doppler shift can then be used to determine the eye velocity. The eye velocity is considered to be a tangential velocity of a point on the ocular surface, this point corresponding to the point where the laser radiation impinges on the ocular surface. Preferably, the eye velocity comprises an absolute value for the current velocity, as well as a direction of the current velocity.

The input unit and/or output unit is then operated based on the determined optical path length and/or the eye velocity. The method thus allows the input unit and/or output unit to be operated by the users eye movement in a particularly simple and efficient manner. The specific method of detecting the eye movement using laser feedback interferometry, especially using the Doppler effect, has the advantage of particularly high temporal sampling rate, so that the eye movement can be detected in particularly high temporal resolution. In addition, the method offers the advantage of using simple and inexpensive components and evaluation algorithms, which have low energy requirements. Especially, no computationally intensive image data processing is required. In addition, it is advantageous that moving components, such as scanning devices, will not be required, thus providing particularly flexible and robust applicabilities.

Preferred further embodiments of the invention are the subject matter of the subclaims.

Preferably, the input unit and/or output unit is activated or deactivated based on optical path length and/or eye velocity. That is, the eye-tracking arrangement is able to initiate activation and/or deactivation of the input unit and/or output unit. Preferably, a deactivated state is a state in which there is no energy consumption of the input unit and/or output unit. Thus, a particularly energy-saving operation of the smart glasses can be provided, as power supply of the gaze detection arrangement is required only when no input of the user and/or no output to the user is required.

Particularly preferably, the gaze detection arrangement directs a single laser beam towards the eye, wherein, based on the optical path length detected, it will be detected when the gaze direction of the eye is aligned such that the single laser beam enters the eye through the pupil. The input unit and/or output unit and/or a portion of the eye-tracking arrangement is be operated based on the detected entrance of this single laser beam into the eye. For example, the eye-tracking arrangement can thus be set to a sleep mode having reduced energy consumption. Preferably, in this sleep mode only the single laser beam is directed towards the eye. By any respective eye movement of the user such that the laser beam enters the eye through the pupil, corresponding to looking in a certain direction, for example downwards in the user vision field, the input unit and/or output unit and/or the eye-tracking arrangement can be operated, and for example can be fully activated. Preferably, the individual laser beam may be designed to be visible to the user during the process, such that the user receives respective optical feedback on operation. This may enable for the smart glasses to be operated particularly power-saving and user-friendly.

Preferably, an eye gesture is recognized based on the optical path length and/or the eye velocity. The input unit and/or output unit will be operated based on a recognized predefined eye gesture. The eye gesture may, for example, be any predefined movement pattern of the eye, such as downwards rotation followed by sideways rotation. Especially, different actions may be performed based on different predefined eye gestures. In particular, it may be sufficient if relative eye movement is determined by the eye tracking arrangement, wherein, for example, determination of absolute eye position is not required to be able to clearly distinguish the predefined eye gestures. Thus, the specific high-resolution and energy-saving detection of eye movements using the eye-tracking arrangement may enable particularly efficient and reliable operation of the smart glasses.

Preferably, the input unit and/or output unit comprises an image projection unit, which is arranged to project an image onto a retina of the eye. By operating the image projection unit using the eye tracking arrangement, especially convenient as well as precise image projection may be provided.

Preferably, image parameters of the image projected by the image projection unit are adjusted based on the determined optical path length and/or eye velocity. This enables particularly high image quality of the image visible to the user, wherein specific adaptation of the image parameters means that, for example, regions where lower image quality is sufficient for anatomical reasons may be displayed with little display effort, to obtain especially efficient operation of the smart glasses.

Particularly preferably, image sharpness and/or image resolution and/or brightness and/or color distribution of the image projected by the image projection unit will be adjusted. Preferably, these image parameters are adapted across the entire vision field of the user corresponding to the instantaneous viewing angle of the eye. Advantageously, the image parameters are adjusted depending on a position of the fovea centralis of the eye, which corresponds to the region of sharpest vision. Especially, the image projected by the image projection unit is adjusted such that in the region of the fovea higher image sharpness and/or higher image resolution than in the surrounding regions of the vision field exists. Particularly preferably, the image sharpness and/or the image resolution decreases radially outward in the users vision field, especially decreases continuously. This enables efficient operation of the smart glasses, as lower display quality of the image projection unit may be realized in the regions where the visual capacity is pronounced in less detail for anatomical reasons. This results in lower computing effort as well as lower energy consumption in the image projection unit.

Preferably, the method further comprises the steps of: detecting a maximum eye velocity during an eye movement, and predicting an eye movement end position based on the maximum eye velocity. Operation of the input unit and/or output unit is thereby performed based on the eye movement end position. Particularly preferably, adjustment of image parameters of the image projected by the image projection unit is performed based on the eye movement end position. In particular, it is thus possible to predict at which position the eye movement stops in the case of rapid eye movements, so-called saccades. Preferably, prediction of the eye movement end position is based on the assumption that the eye performs a uniformly accelerated movement during such an eye movement. That is, there is constant positive acceleration during a first half of such eye movement, whereas constant negative acceleration, especially of the same magnitude, occurs during the second half of the eye movement. By detecting the first half of a corresponding velocity curve, i.e. the velocity of the eye movement starting from standstill up to the maximum velocity during the movement, the second half of the velocity curve may be estimated, especially based on the assumption of mirror symmetry. In this way, especially by integration of the determined velocity curve, the end point of the eye movement may be estimated. Preferably, determination of the maximum velocity during the eye movement is based on detecting a decreasing eye velocity following an increase of the eye velocity. Especially, if adaptation of the image parameters to the predicted eye movement end position occurs, any delay in adaptation of the image parameters in response to a users change of gaze may advantageously be avoided, so that very precise and optimally adapted display of the projected image can always be ensured.

Particularly preferably, the input unit and/or output unit comprises a sound reproduction unit and/or an electronic user device. The electronic user device is preferably provided as a separate device which is connectable to the smart glasses, for example, using wireless connection. This enables particularly flexible use of the smart glasses.

Preferably, a lid closure of the eye is detected based on the optical path length and/or the eye velocity. This means that especially any blink can be detected. In this case, the eye velocity determined is the velocity of eyelid closing. In particular, the eyelid closing may be determined based on a characteristic velocity, and preferably a characteristic direction of the velocity determined by using the eye tracking arrangement. Preferably, detection of the eyelid closure may be used to operate the input unit and/or output unit. For example, a predefined blink pattern or a closing of the eyelid for a predefined period of time may be used to perform any specific action. Furthermore, detection of the eye's eyelid closing may be used for fatigue detection. Thus, particularly broad application of the smart glasses may be provided.

Preferably, at least one portion of the eye tracking arrangement is active at all times. Thus, for example, a particular eye gesture may be performed at any time to operate, especially activate, the input unit and/or output unit, which otherwise may be switched off. As a result, the input unit and/or output unit can be operated as required, enabling particularly low energy consumption of the smart glasses during its entire operating time. Due to the particularly energy-saving method of gaze detection, it can be operative at all times, for example, without high energy consumption of the smart glasses.

Preferably, the method further comprises the step of: detecting a reflectivity of the eye depending on the amplitude and phase position of the radiation backscattered by the eye, thereby, operating the input unit and/or output unit based on the reflectivity. Preferably, this reflectivity-based operation is performed alternatively or in addition to the operation based on the optical path length and/or eye velocity. It is particularly advantageous if an image projection unit is operated based on the determined optical path length and/or the eye velocity and/or based on the reflectivity, especially wherein image parameters of the image projected by the image projection unit are adjusted based on the determined optical path length and/or the eye velocity and/or based on the reflectivity. In this context, reflectivity especially means the complex reflectivity with amplitude and phase position of the radiation being backscattered by the eye. By additionally measuring the reflectivity of the eye, it is thus possible to particularly precisely determine the current position of the eye. Advantageously, based on different reflectivities of different parts of the eye, it can be recognized which portion of the eye is currently irradiated by the laser beam, wherefrom, for example, any absolute eye position may be estimated. For example, reflectivity significantly and characteristically differs when the laser radiation impinges on different parts of the eye. For example, compared to irradiation of the retina, significantly stronger scattering occurs when the laser radiation impinges on the iris of the eye and passes through the cornea. Preferably, determination of the reflectivity may thus be used to determine when anatomical boundaries are moved past the laser beam, which laser beam is especially stationary with respect to a head of the user, during movement of the eye. In this way, any eye movement may be determined with particular ease and precision, for example serving as a trigger for operating the input unit and/or output unit.

Furthermore, the invention results in smart glasses comprising an input unit and/or output unit and a gaze detection arrangement. The input unit and/or output unit is arranged to receive an input from the user and/or to output an output to the user. The gaze detection arrangement comprises a laser device, which is arranged to irradiate at least one laser beam onto an eye, and a control device, which is arranged to operate the laser device. The smart glasses are configured to perform the method described above. The smart glasses are characterized by a particularly simple and inexpensive configuration having high detection rate of eye movements and a low energy requirement.

Preferably, the laser device comprises at least one surface emitter (also called: vertical-cavity surface-emitting laser, or briefly VCSEL) having a photodiode integrated therein. Such a laser device may be used to detect the eye movements with the eye-tracking arrangement having particularly simple, compact and cost-effective design, based on laser feedback interferometry. Such a laser device is especially suitable for the detection by means of the self-mixing effect. Preferably, in this case the photodiode is used to directly detect any overlap of radiation emitted and backscattered within the laser cavity. Particularly preferably, the laser device may comprise a plurality of surface emitters, each of which emitting a laser beam.

Preferably, the at least one surface emitter having a photodiode integrated therein is arranged on a spectacle frame and/or on a spectacle temple. In this context, a spectacle frame is especially regarded as a region of the smart glasses that surrounds the spectacle lens, and a spectacle temple is especially regarded as a holding temple that is connected to the spectacle frame, for example extending to an ear of the user. For example, several surface emitters having integrated photodiodes can distributedly be arranged around the spectacle lens on the spectacle frame, allowing particularly precise scanning of the eye over its entire range of motion. Alternatively or additionally, one or more laser sources may be integrated, preferably molded, into the spectacle lens.

BRIEF DESCRIPTION OF THE DRAWINGS

In the following, the invention is described by means of example embodiments in connection with the figures. In the figures, functionally identical components are each indicated by the same reference numbers, wherein.

PREFERRED EMBODIMENTS OF THE INVENTION

Figure 1:
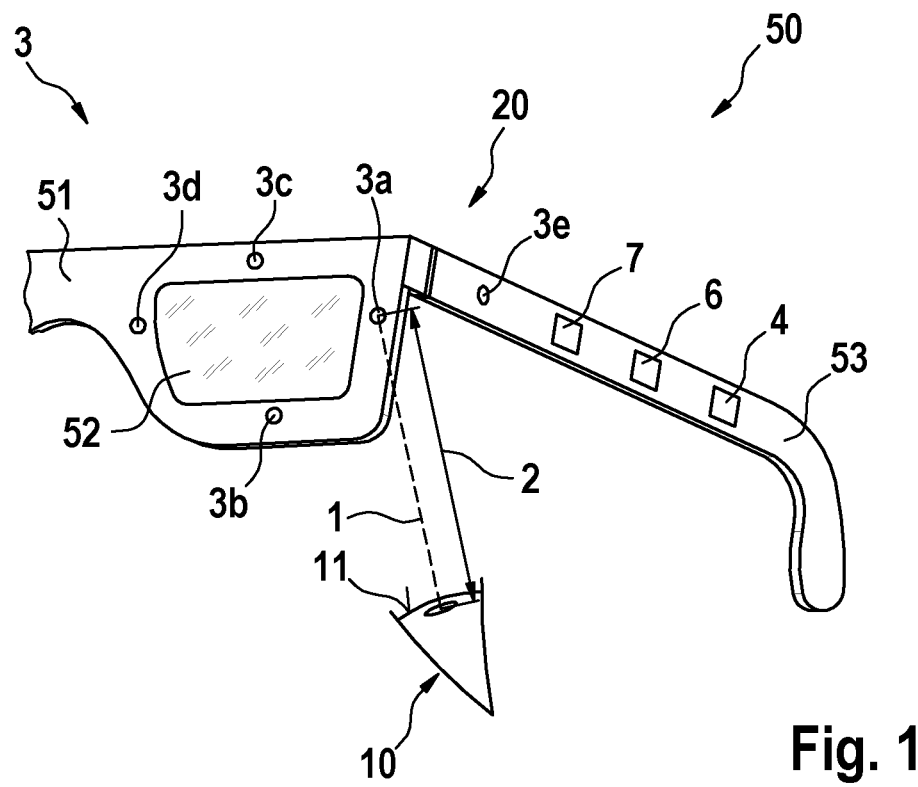
FIG. 1 is a simplified schematic view of a pair of smart glasses according to a first embodiment of the invention.

FIG. 1 shows a simplified schematic view of a pair of smart glasses 50 according to a first embodiment of the invention. The smart glasses 50 comprise a spectacle lens 52, a spectacle frame 51 in which the spectacle lens 52 is received, and a spectacle temple 53 for holding the smart glasses 50 on a users head. The smart glasses 50 are thus configured to be worn on a users head.

The smart glasses 50 comprise a gaze detection arrangement 20, by which a gaze direction of an eye 10 of the user may be determined. For this purpose, the gaze detection arrangement 20 comprises a laser device 3 and a control device 4, which is arranged to operate the laser device 4 to perform a corresponding method for detecting the gaze direction of the eye 10. The control device 4 is arranged in the temple 53 of the smart glasses 50 for compact design.

The laser device 3 includes a total of five surface emitters 3a, 3b, 3c, 3d, 3e as laser sources. Four of the five surface emitters 3a, 3b, 3c, 3d are distributedly arranged on the spectacle frame 51 around the spectacle lens 52. A fifth surface emitter 3e is arranged on the temple 53. Each of the surface emitters 3a, 3b, 3c, 3d, 3e is arranged to irradiate a wavelength-modulated laser beam 1 onto the eye 10. In this case, triangle-modulated laser light is emitted as the laser beam 1 within the wavelength. For reasons of clarity, only one single laser beam 1 emitted by the first surface emitter 3a is shown in the figures. Each laser beam 1 is directed in a separate laser spot 30a, 30b, 30c, 30d, 30e onto an ocular surface 11 of the eye 10.

Figure 2:
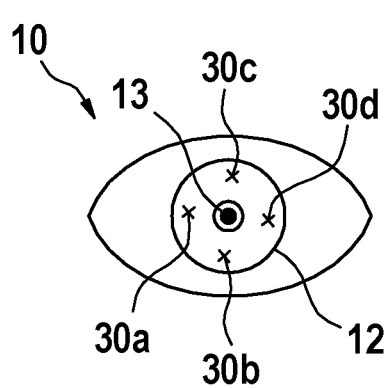
FIG. 2 is a simplified schematic detailed view of a gaze detection procedure using the smart glasses of FIG. 1.
Figure 3:
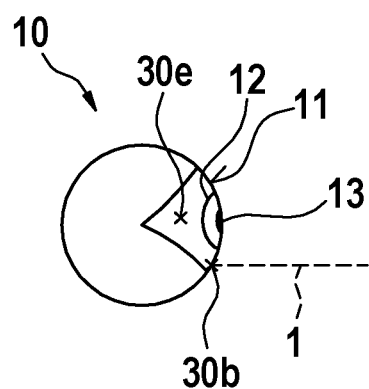
FIG. 3 is another simplified schematic detailed view of the implementation of gaze detection using the smart glasses of FIG. 1.

FIG. 2 shows the laser spots 30a, 30b, 30c, 30d of the first four surface emitters 3a, 3b, 3c, 3d arranged on the spectacle frame 51. In FIG. 3, the fifth laser spot 30e generated by the fifth surface emitter 3e is shown on the side of the eye 10.

As can be seen in FIGS. 2 and 3, the laser spots 30a, 30b, 30c, 30d, 30e are preferably located within a region of the iris 12 of the eye 10, or in the vicinity of that region. As a result, when the eye 10 is moved, the pupil 13 of the eye 10 is often moved close to or through the laser spots 1, so that the position and movement of the pupil 13 may be determined with high accuracy to determine the gaze direction of the eye with high accuracy.

Realization of the method for detecting the gaze direction of the eye 10 is described in detail below, the description being based on a single laser beam 1 only.

The laser beam 1 is initially irradiated onto the eye 10. At the eye surface 11, the laser beam 1 will at least partially be backscattered. As a result, overlap of the irradiated laser beam 1 with the portion of the backscattered radiation propagating back in parallel in the direction of the surface emitter 3a occurs. A laser feedback interferometry is performed to detect the resulting interference radiation, i.e. overlap of irradiated laser radiation 1 and radiation backscattered in the opposite direction using the photodiode integrated in the surface emitter 3a. As the photodiode is integrated directly into the laser cavity of the surface emitter 3a, detection of the resulting interference radiation is performed by the so-called self-mixing effect.

Figure 4:
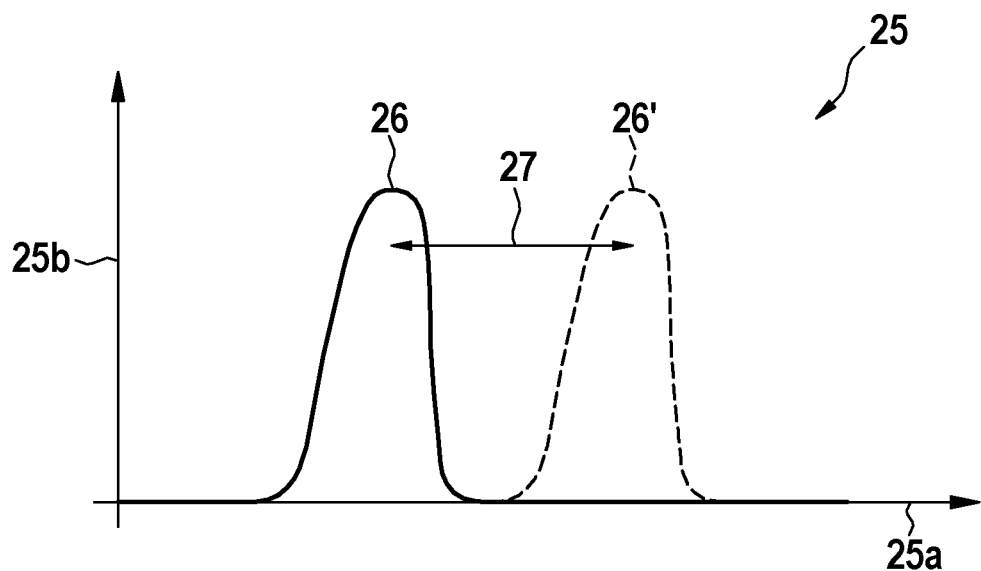
FIG. 4 is a simplified schematic representation of measurement data from the smart glasses of FIG. 1 when performing gaze acquisition.

An exemplary frequency spectrum 25 of the resulting interference radiation, which can be detected by means of the integrated photodiode of the surface emitter 3a, is shown schematically in FIG. 4. The axis 25a corresponds to the frequency and the axis 25b to the amplitude. The reference number 26 indicates the peak frequency of the detected interference radiation, determined for example by means of a Fourier analysis. As a result of triangularly modulating the wavelength of the emitted laser beam 1, the peak frequency 26 is dependent on an optical path length 2. The optical path length 2 (cf. FIG. 1), corresponds to a distance covered by the laser beam 1 between the surface emitter 3a and the ocular surface 11. As the laser beam 1 is irradiated directly onto the eye 10, in the first embodiment of FIG. 1, the optical path length 2 corresponds to the shortest distance between the surface emitter 3a and the eye surface 11. Thus, with a wavelength of the emitted laser beam 1 being known, the optical path length 2 may be determined based on laser feedback interferometry for a specific eye position, i.e. for a specific gaze direction.

FIG. 4 shows an exemplary frequency spectrum 25, which is being recorded during constant movement of the eye surface 11 in relation to the laser beam 1, i.e. during rotation of the eye 10. During such movement, a shift 27 of the peak frequency 26 occurs towards a shifted peak frequency 26' shown as a dashed line, as a result of the Doppler effect. The Doppler shift of the emitted and the backscattered laser radiation resulting therefrom can thus be determined based on the frequency spectrum 25. Based on this Doppler shift, the instantaneous eye velocity of a movement of the eye 10 as well as a direction of the movement can be determined.

Preferably, in addition to the detection of the frequencies of the irradiated and backscattered laser radiation, a reflectivity of the eye 10 can be detected based on an amplitude and phase position of the radiation backscattered by the eye 10. In this context, reflectivity is defined as the complex reflectivity with amplitude and phase position of the radiation being backscattered by the eye 10, wherein the reflectivity is different for different regions of the eye 10. In particular, the determined reflectivity changes when the laser beam 1 passes anatomical boundaries of the eye 10, such as the iris 12 or the pupil 13. Thus, the reflectivity of the eye 10 can be used to estimate which region of the eye 10 is currently irradiated by the laser beam 1. Together with the determined optical path length 2, an instantaneous absolute eye position of the eye 10 can thus be determined.

Thus, any eye movement may be determined using the eye tracking arrangement 20 based on the laser feedback interferometry, wherein any eye movement of the eye 10 may be determined and tracked. In connection with the determination of the absolute eye position, which, for example, is executed at predetermined times only, and additionally based on the reflectivity, the instantaneous gaze direction of the eye 10 can be determined. Due to the components required to perform gaze direction determination, particularly high temporal resolution of the gaze direction determination can be achieved with low energy requirements. In addition, particularly low-cost components can be used.

Furthermore, the pair of smart glasses 50 comprises an input and/or output device 7, which is configured to output an output to the user. The input and/or output device 7 comprises a projection unit, which is arranged to project an image onto a retina of the eye 10. The projection unit can be used, for example, to display an augmented or virtual reality (also: augmented reality AR or virtual reality). Preferably, the projection unit is coupled to the control device 4, wherein the control device 4 is arranged to operate the projection unit depending on the determined gaze direction.

By means of the control device 4, the projected image can thereby be adapted depending on the gaze direction. For particularly efficient and user-friendly operation, image parameters of the image projected by the projection unit are adjusted depending on a position of the optic pit (fovea centralis) of the eye 10, which corresponds to the region of sharpest vision. In this regard, the position of the optic pit may be determined based on any previous calibration of the eye detection arrangement 20.

The image projected by the image projection unit will thus be adapted such that higher image sharpness and higher image resolution are present in the region of the optic pit than in the circumferential regions of the field of vision. Preferably, the image sharpness and/or the image resolution decreases radially outwards with respect to the users field of vision. In this way, particularly efficient operation of the smart glasses 50 can be provided, as lower display quality of the image projection unit can be realized in the regions where the visual capacity is less pronounced for anatomical reasons. This will result in lower computational effort as well as a particularly low energy requirement for the smart glasses 50.

Furthermore, eye gestures can be recognized with the eye tracking arrangement 20. For example, a variety of predefined eye gestures can be assigned to different predetermined actions of the smart glasses 50. For example, an eye gesture may be defined as a predefined sequence of movements of the eye 10. For example, an eye gesture may be a rotation vertically downwards followed by a horizontal rotation to the right. This corresponds to the user first looking downwards and then looking to the right.

If such eye gesture is detected based on the eye velocity and optical path length 2 determined using the eye tracking arrangement 20, the image projection unit can be operated in a predefined manner. For example, the image projection unit can be activated or deactivated to enable operation of the smart glasses 50 as required, and thus in a particularly energy-saving manner. Alternatively or additionally, the eye gesture can be used to activate operation of menu options of contents displayed in an augmented or virtual reality. For example, it is particularly convenient if a particular eye gesture, preferably upwards and/or downwards rolling of the eye 10, activates scrolling of content displayed in the augmented or virtual reality.

Figure 5:
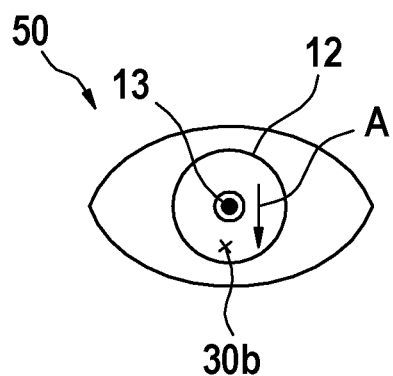
FIG. 5 is another simplified schematic detailed view of the gaze acquisition performance using the smart glasses of FIG. 1

A particularly simple and energy-saving way of operating the smart glasses 50 is shown in FIG. 5. In FIG. 5, an operating state of the smart glasses 50 is shown, wherein the input unit and/or output unit 7 is deactivated and the eye tracking arrangement 20 is in a sleep mode. In the sleep mode, only exactly one of the surface emitters 3b of the gaze detection arrangement 20 is operable, with all other surface emitters 3a, 3c, 3d, 3e being deactivated. Through the single active surface emitter 3b, only a single laser beam 1 is directed to the eye 10 in exactly one laser port 30b, as shown in FIG. 5.

In the sleep mode, a simplified eye detection is performed. Specifically, for example only the optical path length 2 is determined. Based on the optical path length 2, it may be determined when the eye 10 is moved into a position such that the single laser beam 1 can enter the eye 10 through the pupil 13. This applies to the operating state shown in FIG. 5 when the user looks downwards, i.e., when the eye 10 performs rotation vertically downwards towards the direction A. This specific eye gesture, i.e. the state when the laser beam 1 enters the eye 10, is used herein to activate the projection unit as well as the inactive portion of the eye-tracking arrangement 20. A feedback about the activation may be indicated to the user by emitting the single laser beam 1 as a visible light from the surface emitter 3b.

Figure 6:
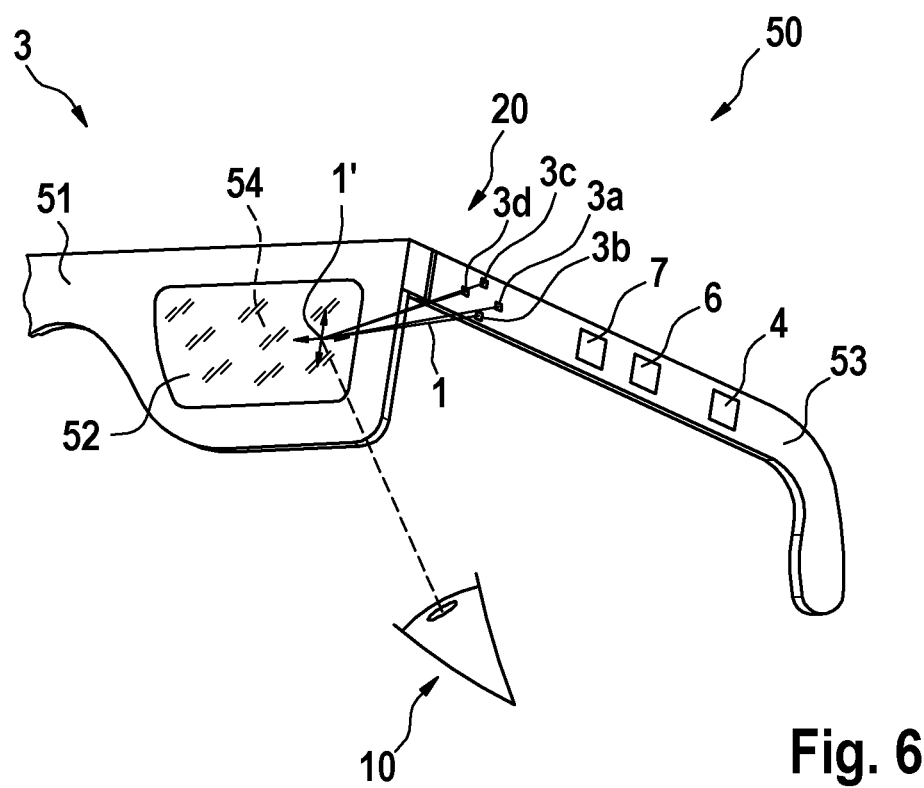
FIG. 6 is a simplified schematic view of smart glasses according to a second embodiment of the invention.

FIG. 6 shows a simplified schematic view of a pair of smart glasses 50 according to a second embodiment of the invention. The second embodiment essentially corresponds to the first embodiment of FIG. 1 but with the difference of the laser device 3 being alternatively arranged. In the second embodiment of FIG. 6, the laser device 3 of the eye tracking arrangement 20 comprises four surface emitters 3a, 3b, 3c, 3d comprising integrated photodiode, all of which are arranged on the spectacle temple 53. The laser beams 1 emitted by the surface emitters 3a, 3b, 3c, 3d will thus be indirectly irradiated onto the eye 10.

Specifically, the laser beams 1 are irradiated onto the spectacle lens 52, exemplified by a focusing point 1' on the spectacle lens 52. A deflection element 54 in the form of a holographic optical element is integrated into the spectacle lens 52, which deflects the laser beams 1 towards the eye 10. In this way, an alternative arrangement of the laser device 3 may be provided, by which the optical path length 2 and the eye velocity may also be efficiently determined as a basis for operating the input unit and/or output unit 7.

The invention claimed is:

1. A method for operating a pair of smart glasses comprising an input unit and/or output unit and a gaze detection arrangement, wherein the gaze detection arrangement detects any eye movement of an eye by the method comprising the steps of:
    irradiating at least one wavelength-modulated laser beam onto the eye,
    detecting an optical path length of the irradiated laser beam based on laser feedback interferometry of the irradiated laser beam and the portion of the laser beam backscattered from the eye,
    detecting a Doppler shift of the irradiated laser beam and the backscattered portion based on the laser feedback interferometry, and
    detecting an eye velocity based on the Doppler shift, and
    wherein the input unit and/or output unit is operated based on the optical path length and/or the eye velocity,
    wherein triangle-modulated laser light is emitted as a wavelength-modulated laser beam, and wherein the optical path length is determined by analyzing the radiation which is interferingly emitted and backscattered by calculating an average of the resulting interference frequencies with respect to the two edges of the triangle-modulated signal.

2. The method according to claim 1, wherein the input unit and/or output unit is activated or deactivated based on the optical path length and/or the eye velocity.

3. The method according to claim 1, wherein the gaze detection arrangement directs a single laser beam towards the eye, wherein it is detected when the single laser beam enters into the eye through a pupil, based on the detected optical path length, and wherein the input unit and/or output unit and/or a portion of the gaze detection arrangement is operated, based on the detected entrance of the single laser beam into the eye.

4. The method according claim 1, wherein an eye gesture is detected based on the optical path length and/or the eye velocity, and wherein the input unit and/or output unit is operated based on a detected predefined eye gesture.

5. The method according to claim 1, wherein the input unit and/or output unit comprises an image projection unit projecting an image onto a retina.

6. The method according to claim 5, wherein image parameters of the image projected by the image projection unit are adjusted based on the optical path length and/or eye velocity.

7. The method according to claim 6, wherein an image sharpness and/or an image resolution and/or a brightness and/or a color distribution of the image projected by the image projection unit will be adjusted.

8. The method according to claim 1, further comprising the steps of:
    detecting maximum eye velocity during eye movement, and
    predicting an eye movement end position based on the maximum eye velocity,
    wherein the input unit and/or output unit is operated based on the eye movement end position, preferably wherein the image parameters of the image projected by the image projection unit are adjusted based on the eye movement end position.

9. The method according to claim 1, wherein the input unit and/or output unit comprises a sound reproduction unit and/or an electronic user device, which is preferably provided as a separate device.

10. The method according to claim 1, wherein a lid closure of the eye is detected, based on the optical path length and/or the eye velocity.

11. The method according to claim 1, wherein at least a portion of the eye tracking arrangement is active at all times.

12. The method according to claim 1, further comprising the step of:
    detecting any reflectivity of the eye based on an amplitude and phase of the radiation backscattered from the eye, wherein the input unit and/or output unit is operated based on the reflectivity.

13. A pair of smart glasses, comprising:
    an input unit and/or output unit arranged to receive an input from the user and/or output an output to the user; and a gaze detection arrangement for detecting any eye movement of an eye, wherein the gaze detection arrangement comprises a laser device adapted to irradiate at least one laser beam to the eye, and a control device adapted to operate the laser device, and wherein the smart glasses are adapted to:

irradiate the at least one laser beam onto the eye, detect an optical path length of the irradiated laser beam based on laser feedback interferometry of the irradiated laser beam and the portion of the laser beam backscattered from the eye, detect a Doppler shift of the irradiated laser beam and the backscattered portion based on the laser feedback interferometry, and detect an eye velocity based on the Doppler shift, and wherein the input unit and/or output unit is operated based on the optical path length and/or the eye velocity, and wherein triangle-modulated laser light is emitted as a wavelength-modulated laser beam, and wherein the optical path length is determined by analyzing the radiation which is interferingly emitted and backscattered by calculating an average of the resulting interference frequencies with respect to the two edges of the triangle-modulated signal.

14. The pair of smart glasses according to claim 13, wherein the laser device comprises at least one surface emitter having a photodiode integrated therein.

15. The pair of smart glasses according to claim 14, wherein the at least one surface emitter having a photodiode integrated therein is arranged on a spectacle frame, which especially surrounds a spectacle lens, and/or on a spectacle temple, and/or in a spectacle lens.

* * * * *